Jan. 2, 1968  H. R. AXELROD  3,361,566

FREEZE DRIED FOOD ARTICLE FOR AQUATIC ANIMALS

Filed Dec. 2, 1966

INVENTOR
HERBERT R. AXELROD

BY
*Richards & Cifelli*
ATTORNEY

United States Patent Office

3,361,566
Patented Jan. 2, 1968

3,361,566
FREEZE DRIED FOOD ARTICLE FOR
AQUATIC ANIMALS
Herbert R. Axelrod, Deal, N.J., assignor to T.F.H.
Publications, Inc., Jersey City, N.J., a corporation
of New York
Filed Dec. 2, 1966, Ser. No. 598,847
10 Claims. (Cl. 99—3)

ABSTRACT OF THE DISCLOSURE

Novel food articles for feeding aquatic animals are described which are composed primarily of freeze-dried high protein materials selected from the group consisting of mammalian meat, including muscle tissue, liver and heart, brine shrimp, tubifex worms, earth worms, and other fleshy worms, including such articles containing naturally occurring dry, non-tacky, water-activatable adhesive substances, and similar articles having added adhesives incorporated therein or applied to a surface thereof.

BACKGROUND OF THE INVENTION

Field of the invention

The present invention relates to novel manufactured foods for aquatic animals, including fish and Amphibia. For convenience the invention will be described hereinafter primarily with reference to fish, but it is to be understood that wherever the term "fish" is employed, unless the context specifically dictates otherwise, it is intended to encompass all aquatic animals, including those which are strictly aquatic such as fish, and those which spend at least part of their life out of water such as the Amphibia. More particularly, the invention relates to adherent food articles for aquatic animals.

Description of the prior art

In recent years, due to increasingly widespread interest in keeping and breeding aquatic animals in the home and elsewhere, much work has been done on the development of general and special purpose prepared foods, particularly for tropical and other small fish suitable for aquarium culture. Previously available prepared fish foods have taken the form of dry granular, pelletized, or flake materials for the most part, although a number of frozen foods have also been available. Natural fresh or live fish foods, such as daphnia, brine shrimp and tubifex and other small worms are also available commercially. Of the previously available prepared foods, those which have been found readily acceptable by fish, have in greater or lesser degree suffered from the disadvantage of being awkward to handle and, in particular, of being difficult to divide into accurate portions. This has been a serious drawback, particularly on occasions when fish must be fed by inexperienced persons, since any excess food not eaten by the fish within a short time after feeding will decay and foul the water in the tank, often causing it to become malodorous, cloudy and discolored. This is not only distressing to the viewer but is unhealthy for the fish due to the reduction in the available oxygen content and to the increase in waste gases accumulated in the aquarium water.

The tendency to foul water is particularly acute with dry particulate prepared foods, even those which float on the surface of the water for a time, since such foods tend to disperse quickly over the surface of the water, and eventually sink and become dispersed throughout the aquarium, thus making recovery of uneaten food virtually impossible. Available frozen fish foods, such as frozen daphnia, gammarus, brine shrimp, tubifex worms, and other small aquatic organisms, are more easily portioned than dry particulate foods and thus the likelihood of over feeding is lessened somewhat, but even these materials are slippery and difficult to handle or divide when frozen, and when introduced to the tank, quickly thaw and disintegrate into small particles which become completely dispersed in the aquarium and, if uneaten, foul the water. Fresh and live natural foods such as ground liver, and live daphnia, brine shrimp and tubifex worms, for example, while highly desired by the fish are also difficult to portion and to keep fresh between feedings.

Heretofore, the soundest approach to the problem of feeding fish without fouling the water with excess uneaten food has been to provide foods which float and can, therefore, be recovered from the surface of the water. It has been suggested, for example, that floating fish food pellets be made by mixing a plurality of finely screened meals and mechanically forming the mixture into hollow pellets. Another floating fish food previously suggested is prepared by grinding the food ingredients to granular form, mixing the ingredients with a binder, forming a thick aqueous slurry, and heating the slurry between hot platens to form a sheet material which can be broken into flakes which float due to the low specific gravity of the product. Although a floating fish food can be recovered, in practice it has been found that particulate foods of this type become widely scattered over the surface of the water, thus necessitating skimming the entire surface for recovery. Moreover, as noted above, previously available particulate fish foods which float for a time, tend to become saturated with water, sink and become dispersed throughout the aquarium before being recovered from the surface.

The prior art is also replete with various devices, generally intended to float on the surface of the water, which confine or disperse particulate food. For example, floating and fixed feeding rings have been used to confine particulate flake or granular fish food to the area of the surface of the water surrounded by the feeding ring. Such rings do not solve the problem of accurate portioning of particulate food, however, and also fail to prevent dispersion of such food throughout the aquarium after it becomes wet and sinks below the confines of the ring. Floating containers having bottom walls provided with a plurality of perforations have also been used to feed live worms to fish, the worms being placed in the container and allowed to pass through the holes in the bottom to become accessible to the feeding fish. Such feeding devices also fail to aid in portioning tangled gobs of live worms and provide such slow access to the worms that the aquarist is deprived of the pleasure of watching actively feeding fish.

SUMMARY OF THE INVENTION

It has long been apparent, therefore, that a need has existed in the art for a convenient, fool-proof means of feeding the fish in an aquarium or other relatively limited environment, which would provide sufficient food for a single periodic feeding of the fish without, however, introducing excess food which would decay and tend to foul the water. This long-felt need in the art has now been met by the articles of the present invention, which is based upon the novel concept of feeding fish or other aquatic animals by providing a unified mass of fish food, capable of being torn apart by feeding fish, adhered to a suitable surface positioned so that the adhered mass of food is accessible to the feeding fish. In this way fish are enabled to feed from the mass of fish food by tearing off and consuming small pieces until the mass of food is substantially completely consumed. Inasmuch as the bulk of the food separated from the mass is normally immediately consumed, dispersion of food particles is greatly inhibited, thus preventing fouling of the water by decay of uneaten dispersed food particles. In the rare instance when the unified mass of food, or any portion thereof, becomes separated from the surface to which it is adhered and is not immediately consumed by feeding fish, due to the persistent bouyancy of the food articles of the present invention, the separated portion will float to the surface of the water and remain there so that it can be removed before it sinks or decays.

DESCRIPTION OF THE PREFERRED EMBODIMENTS

Figure 1:
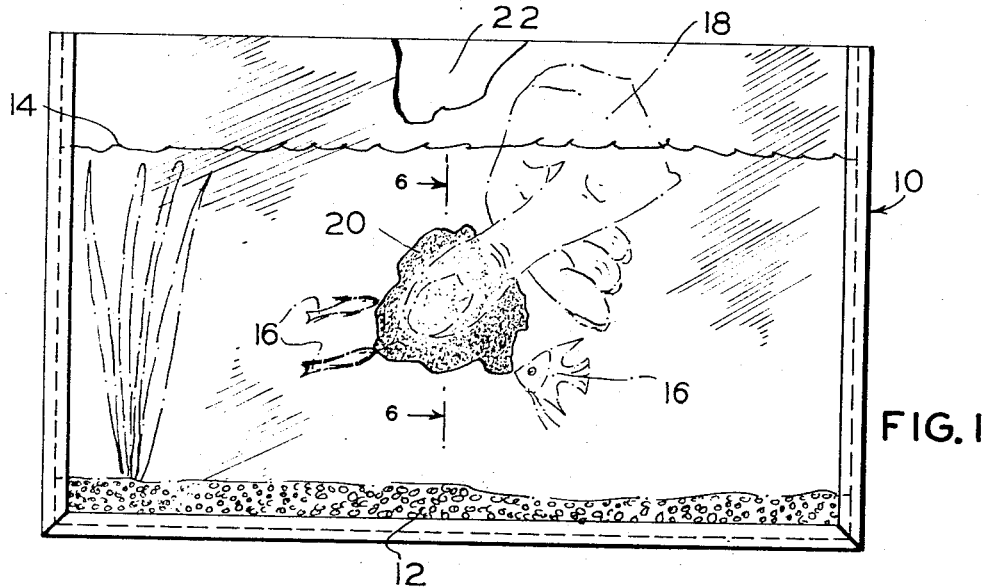
FIG. 1 is a side elevational view of an aquarium showing a fish food article being manually pressed against the rear inner wall.
Figure 2:
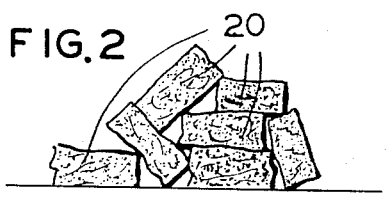
FIG. 2 is a side elevational view, actual size, of a plurality of tubifex worm fish food articles of the invention.

Referring now to the drawing, in which like reference numerals designate like parts, there is shown a conventional aquarium consisting of a tank 10 having four glass side walls and a slate bottom cemented in water-tight engagement with a steel frame. The tank 10, which is open at the top, contains gravel 12, water 14, water plants, if desired, and a plurality of fish 16. A fish food article 20 of the invention consisting of freeze-dried tubifex worms prepared as described hereinafter is shown in FIG. 1 being pressed against the inner surface of the rear glass wall 22 of the tank, beneath the surface of the water 14 by the thumb of a human hand 18. The fish food article 20, when dry, is generally rectangular in shape and of approximately the size shown in FIG. 2, but as can be seen in FIG. 1, when immersed in water and pressed against a suitable surface becomes deformed into an amorphous, but unified mass. A fish food article 20 has been drawn on an enlarged scale in FIG. 3 to show the desiccated bodies of individual tubifex worms within the unified mass.

Figure 3:
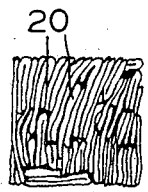
FIG. 3 is a side elevational view of an article of FIG. 2, drawn on an enlarged scale.

Another embodiment of the invention is illustrated in FIG. 3 which shows in actual size, a plurality of fish food articles 24 composed of freeze-dried brine shrimp prepared as described hereinafter. One of the brine shrimp fish food articles is shown on an enlarged scale in FIG. 5; the irregular shapes shown in solid lines representing random irregularities in the color and physical structure of the product. Individual brine shrimp can not readily be distinguished with the naked eye when a large number of them are freeze-dried to form a unified mass as described hereinafter.

Figure 6:
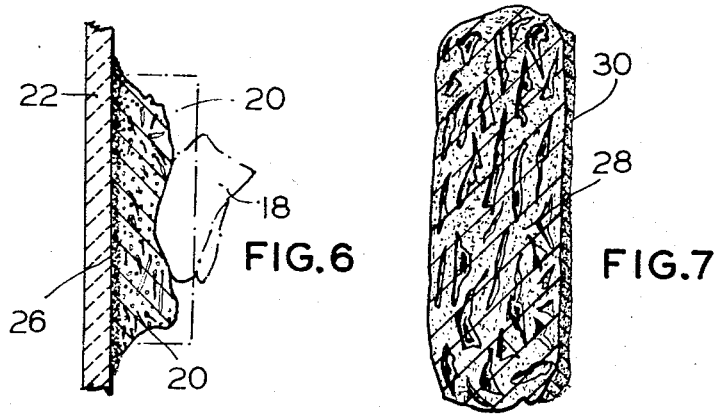
FIG. 6 is a cross sectional view taken on the line 6—6 of FIG. 1, and drawn on an enlarged scale, showing a wet fish food article of the invention adhered to a surface with a layer of adhesive substance therebetween.

The new fish food articles of the invention typified by the tubifex articles 20 and the brine shrimp articles 24, when prepared as described below, contain a substance derived from the tubifex worms and brine shrimp which, although nontacky when dry, becomes adhesive in the presence of moisture. It has been observed that this water-activatable adhesive substance tends to be expressed from the fish food article when it is pressed against a surface in the presence of moisture. This may be seen in FIG. 6, a cross section taken on the line 6—6 of FIG. 1, which shows a layer of the water-activatable adhesive 26 which has been expressed from the wet tubifex fish food article 20 by manual pressure of the human thumb to form an adhesive layer between the deformed fish food article and the glass wall 22.

Figure 7:
FIG. 7 is a cross sectional view, drawn on an enlarged scale, showing a fish food article of the invention with an added coating of adhesive on one surface thereof.

The invention also includes manufactured fish food articles, such as the brine shrimp article 28 shown in FIG. 7, which have a layer of added adhesive 30 on at least one surface thereof. The added adhesive 30 may be additional adhesive material derived from the raw material from which the food article is made, i.e. tubifex or other worms, brine shrimp, or mammalian meat, or it may be any other suitable water-activatable adhesive, or any suitable pressure sensitive adhesive such as the rubber base materials used in surgical adhesive tape.

The preferred fish food articles of the invention are those containing no added adhesive but which are sufficiently adherent in the presence of moisture for the purposes of the invention. These new fish food articles are desiccated materials derived by freeze drying certain fleshy foods of animal origin; more specifically, mammalian meat, including muscle tissue, heart and liver and mixtures thereof, brine shrimp, and tubifex or other small worms, including earth worms, and mixtures of these foods. In general, the process of making the new fish food articles comprises initial cleaning or other preparation of the fresh, raw fish food including the blending of any supplementary ingredients, filling of the food into shallow pans or otherwise forming it into a relatively thin layer, quickly freezing the food and desiccating the frozen material under vacuum according to techniques known per se in the freeze-drying art. The freeze-dried material may then be sterilized, if desired, to kill any harmful bacteria or ova of parasites that may be present. The resulting product is a desiccated sheet of fish food having a moisture content of about 5% by weight or less, which can be cut into pieces of any desired size, providing suitable portions for a single feeding. Provision is preferably made for keeping the fish food products dry until used, since such products are generally hygroscopic.

Fish food products derived in this way from the raw materials recited above, while dry and non-tacky to the touch, are inherently adhesive in the presence of moisture, although some of the products are normally more strongly adhesive than others. More specifically, articles prepared as above from tubifex worms have very satisfactory adhesion for suitable surfaces when pressed thereagainst in the presence of moisture. Similar articles derived from brine shrimp, while adhesive in the presence of moisture, are less strongly adhesive than the tubifex articles. It has been found that certain other possible fish food materials, such as common sea shrimp, when freeze-dried as described above, are not adherent to suitable surfaces in the presence of moisture and thus are not operable in the present invention in the absence of added adhesive material.

As noted above the invention also includes freeze-dried fish food articles containing added adhesive. Such adhesive is either blended with the fresh food material prior to freeze-drying to produce a fish food article having the adhesive more or less uniformly distributed throughout the article, or it may be applied as an external coating to at least one surface of the article after the freeze drying operation. Conventional blending and coating techniques may be employed in supplying the added adhesive. Any suitable adhesive may be employed in amounts which will render the finished article adherent to a suitable surface in the presence of moisture. In general, it is preferred to employ adhesive substances of animal origin when the adhesive is to be blended in the food prior to freeze drying although suitable synthetic substances can also be employed. When the adhesive is to be coated on the surface of the article after freeze-drying, adhesives of animal origin may also be employed, but, in addition, synthetic pressure-sensitive adhesives, such as the rubber-base materials employed on surgical adhesive tapes may also be used. The invention will now be described in greater detail in the following specific examples.

believed to be due to the variation in the type and amount of degraded proteinaceous substances present.

In order to improve the adhesive qualities of freeze-dried fish food articles which are not inherently strongly adhesive, degraded proteinaceous materials extracted from the same or different food materials may be incorporated in the raw or fresh food prior to freeze-drying or may be applied as an external coating after freeze-drying. The degraded proteinaceous adhesive substances may be extracted from mammalian meat, tubifex worms or other animal substances rich in such materials by any suitable technique. For instance, as described above in Example IV, a mass of macerated tubifex worms may be suspended in a mild carbonate solution (1 to 10% by weight) and centrifuged to remove the solid matter and collect the liquor rich in the desired natural adhesive materials. This liquid may then be blended with fresh food, such as live brine shrimp, for example, in order to enrich it in the natural adhesives prior to freeze-drying to produce an adherent fish food article containing the added adhesive. Other known adhesive materials can be used in the same way to improve the adhesive properties of the new fish food article. Such adhesive materials include available adhesives based upon casein or other uncoagulated animal substances such as albumin, globulin, gelatin, blood serum or the like, or carbohydrates such as starch, dextrin, gum arabic and the like, or mixtures of these substances. Any of the adhesive materials recited above may also be coated on the surface of an article after freeze-drying in order to render it adhesive in the presence of moisture. As noted in Example IV conventional blending and coating techniques and apparatus may be used to incorporate the recited adhesives in the body or on the surface of the new fish food articles, as desired.

The bond produced by adhesive substances which are found in the freeze-dried articles of the invention derived from mammalian meat, tubifex worms, earth worms and brine shrimp, for example, is transient, in an aqueous environment, but is sufficiently enduring for the purposes of the present invention. This is probably due to the fact that when a fish food article of the invention is pressed against a suitable surface under water, there is sufficient water available to not only hydrate and activate the adhesive, but to eventually solubilize it and destroy the bond. It should be noted that if the freeze-dried food has a closed cell structure, a slight vacuum may be created when it is pressed against the surface, thus aiding adhesion, as noted above, by virtue of the osmotic pressure of the surrounding water. Any air pockets within the food article would aid in this pressure phenomenon. This is the case with the articles of the present invention which, although closely packed, are light in weight and compressible, especially when wet. The freeze-dried tubifex worm product prepared according to Example I, for instance, is readily compressible when wet to about 50% of its dry volume by digital pressure against a surface to which it is to be adhered. It should also be noted that the freeze-dried products of the present inveniton, which are derived from mammalian meat, tubifex and other worms, and brine shrimp, and which are found to be inherently adherent when pressed against a surface in the presence of moisture, are all characterized by a porous, fibrous structure containing voids permitting compression. Similar products prepared by freeze-drying ocean shrimp or small hard shelled organisms such as daphnia or meal worms, which are not fibrous in nature, are not operative in the present invention without added adhesive, because they are not inherently adherent when pressed against a surface in the presence of moisture.

The presently preferred fish food articles of the invention contain substantially all high protein animal matter, since they are derived by freeze-drying 100% whole or ground fresh mammalian meat, including muscle fiber, liver, and heart, brine shrimp, or tubifex or other small soft fleshy worms. However, the invention also includes fish food articles prepared in exactly the same way from mixtures of the recited fresh animal food matter blended with suitable proportions of other fleshy foods, adjuvants, fish attractants, medicaments, added nutrients or other materials. In general such other ingredients may be added in amounts up to about 50% by weight but it is preferred not to use more than about 5 to 20% by weight of such materials. Where it is desirable to provide adhesiveness or enhance the natural adhesiveness of a fish food article, up to about 25% by weight of added adhesive may be employed, although 1 to 10%, or usually about 5% is generally sufficient. It is also preferred that the total amount of adhesive and ingredients other than the essential high-protein animal food ingredients, not exceed about 50% of the unified mass of fish food, exclusive of any layer of adhesive on the surface of a fish food article.

The preferred fish food articles of the present invention have the ability to float for a period of at least about 48 hours in the event that they become detached from a surface to which they have been adhered. For this reason, whether the fish food remains attached to the aquarium wall or other surface, or becomes detached and floats on the surface of the water, it can be observed whether or not it has been completely consumed before introducing additional food to the aquarium, thus obviating over feeding and fouling of the water in the aquarium.

As noted above, suitable portions of the three-dimensional freeze-dried fish food articles for single feedings in aquariums or most sizes are generally about ¼ to ½ inch thick and ½ to 2 inches in length and width. Chips or unified masses of this size composed of the new freeze-dried fish foods are found to have sufficient surface area to adhere sufficiently strongly to wet glass or any other suitable surface when pressed thereagainst to resist being dislodged by feeding fish.

It has been found that the fish foods and fish food articles of the present invention for the first time provide means for feeding fish which can be entrusted to unskilled operators or those unfamiliar with the problems attendant to feeding fish by prior means, without endangering the health of the fish or detracting from the aesthetic enjoyment of an aquarium due to fouling of the water by uneaten decayed food. Moreover, the new fish foods and fish food articles may be conveniently, easily and accurately divided into portions of predetermined size and kept available for instant use without refrigeration or messy handling being required.

Another advantage of the adherent fish food articles is that they may be adhered to a surface at any desired level in an aquarium, for example, thus affording an opportunity for fish of various species to feed near the surface, bottom or at intermediate levels of the aquarium according to their natural habits.

The foregoing illustrates the practice of this invention, which, however, is not to be limited thereby, but is to be construed as broadly as permissible in view of the prior art and limited by the scope of the appended claims.

What is claimed is:

1. A manufactured food article for aquatic animals comprising, in combination, a unified mass of food and means for adhesively attaching said mass to a surface, said unified mass comprising freeze-dried animal matter selected from the group consisting of small soft fleshy worms, brine shrimp and mixtures thereof, said animal matter being detachable in fragments from said mass by aquatic animals feeding thereon.

2. A dry, non-tacky food article according to claim 1, wherein the means for adhesively attaching said mass to a surface is an adhesive substance derived from the animal matter in said mass, said adhesive being activated in the presence of moisture to enable said mass to be adhered to a surface.

3. A dry, non-tacky fish food article according to claim 1, wherein the means for adhesively attaching said mass to a surface includes an added adhesive substance, said

EXAMPLE I

A freeze-dried unified mass of fish food which will adhere to a wetted surface such as glass without added adhesive is prepared as follows: Living tubificid worms (Tubifex sp.), which are commonly known to aquarists as tubifex worms, are collected in their native habitat. As is well known, such worms are found in rivers throughout the world, existing in large colonies in mud immediately adjacent to areas rich in sewage. Such worms are an excellent source of protein, are avidly devoured by fish, and are of such small size that they may be eaten by all but very small young fish. The live tubifex worms are placed in clean running water for a period of about 72 hours at the end of which time the worms have emptied their digestive tracts. Although the worms can be freeze-dried immediately upon collection, they usually contain undesirably large amounts of foreign matter which is preferably removed. The living worms are then placed in suitable shallow containers such as pans about 3 feet square. The pans are then placed in a conventional low temperature freezer and quick frozen by subjecting them to a temperature of 0° F. for about 2 hours. The pans of quick frozen worms are then placed in a conventional vacuum dryer and subjected to a temperature of about −25° C. and a vacuum of about 0.1 to 0.5 mm. of Hg pressure. While in the vacuum dryer the frozen worms are subjected to ultraviolet radiation to sterilize the worms and kill any harmful bacteria which the worms might be carrying in order to prevent growth of these harmful organisms in the aquarium or other environment to which the fish food is ultimately introduced. The vacuum drying of the frozen worms is continued until a desiccated sheet of intertwined worms containing about 5% by weight or less moisture is obtained. The depth of live worms loaded into the pans is such as to produce a dried sheet about 1/8" to 1" or preferably about 1/4" to 1/2" in thickness. Thinner or thicker sheets may be produced if desired but sheets thinner than 1/4 inch, especially below 1/8 or 3/16 inch in thickness tend to have poor mechanical strength and are, therefore, more difficult to handle and portion without waste. Sheets more than 1/2 inch thick may be prepared but it is seldom necessary to do so since sheets of 1/4 to 1/2 inch in thickness generally provide a sufficiently large portion of worms for a single feeding for aquarium purposes, when cut into pieces of about 1/2 to 2 square inches in area. After cutting the desiccated sheet of worms into portions of desired sizes, these portions are placed in plastic containers and subjected to treatment with either nitrogen or carbon dioxide at about 50 p.s.i.g. at room temperature. In order to kill Salmonella which may infest the fish food it is desirable to subject the material to 80° C. heat for about 30 minutes. The resulting chips or pieces of desiccated tubifex worms are then placed in plastic bottles with screw caps for shipment and storage until used. Packaging of this or a similar type, which limits access of moisture to the fish food, is desirable, since freeze-dried fish food is normally hygroscopic. The chips produced in this way when immersed in water in an aquarium and pressed against the wet inner surface of one of its glass sides, will adhere to the glass sufficiently tightly to remain in place while the fish in the aquarium voraciously attack the chip, tugging at and removing morsels therefrom. The pressure required to cause adhesion of such chips of desiccated fish food is only light to moderate manual or digital pressure.

EXAMPLE II

Figure 4:
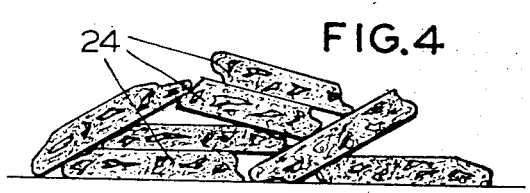
FIG. 4 is a side elevational view, actual size, of a plurality of brine shrimp fish food articles of the invention.
Figure 5:
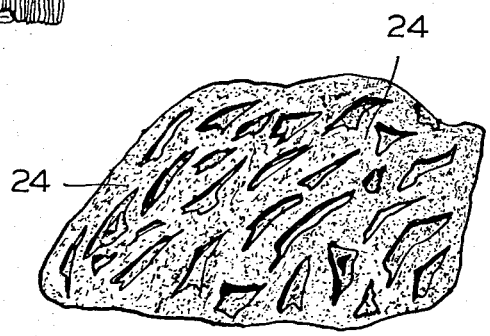
FIG. 5 is a side elevational view of an article of FIG. 4, drawn on an enlarged scale.

The procedure of Example I is followed but substituting live brine shrimp to obtain the freeze-dried product illustrated in FIGS. 4 and 5 of the drawings, which will be found to be inherently adhesive to a suitable surface such as glass when pressed thereagainst in the presence of moisture, but somewhat less strongly adhesive than the corresponding tubifex product.

EXAMPLE III

The process of Example I is followed employing mammalian meat, to be specific, fresh beef muscle tissue ground in a conventional grinder to produce comminuted, extruded beef in a form commonly referred to as hamburger, or chopped or ground beef. The resulting freeze-dried product will be found to have adequate inherent adhesion to glass or other suitable surfaces in the presence of moisture. This procedure is also followed substituting whole beef heart, whole beef liver, ground beef heart, ground beef liver, ground large earth worms and whole small immature earth worms, as well as mixtures in any combination of ground beef muscle tissue, heart, liver and ground earth worms, or mixtures of tubifex worms and brine shrimp, or any of these materials with ground beef muscle, liver and heart, or mixtures of whole tubifex worms with whole small earth worms. Freeze dried fish food articles prepared in this way generally will be found to be adequately adhesive to suitable surfaces in the presence of moisture.

EXAMPLE IV

The procedure of Example II is followed except that the live brine shrimp are gently blended with an equal volume of a liquid adhesive substance obtained by macerating a mass of live tubifex worms, suspending the mass in an equal volume of a mild aqueous sodium carbonate solution and centrifuging to remove the solids to obtain the adhesive-enriched liquor. The resulting freeze-dried product will be found to have improved adhesive strength in the presence of moisture when pressed against a glass surface, as compared with the article of Example II.

EXAMPLE V

Freeze-dried brine shrimp articles are prepared according to Example II, except that the sheet of freeze-dried food in the shallow pan, is coated with a layer of a liquid adhesive material, prepared as described in Example IV, and returned to the vacuum drying operation. When the layer of added adhesive material is dry, it may be removed from the dryer and divided into small portion-size pieces as before. In this way a fish food article is prepared of the type shown in FIG. 7, having a coating of added water-activatable adhesive on at least one surface thereof.

EXAMPLE VI

A freeze-dried fish food article, such as the brine shrimp article of Example II is prepared up to the point of freeze drying but is not divided into portions. The sheet of fish food in the shallow pan is coated with a layer of a rubber base, pressure sensitive, adhesive of the type used on surgical adhesive tapes, and the coated sheet is then divided into portion-size chips as before. Articles prepared in this way have a layer of pressure sensitive adhesive on one surface as shown in FIG. 7, and are adherent to wet glass or other suitable surfaces when pressed thereagainst.

While not wishing to be bound by any theory, it is presently believed that the freeze dried fish food articles of the invention which are found to adhere to suitable surfaces in the presence of moisture, in the absence of added adhesive, do so primarily because they contain adhesives derived from the animal food material itself. These adhesives, although dry and non-tacky in the dry freeze-dried product, are apparently hydrated in the presence of moisture to become tacky and capable of temporarily bonding the food article to a suitable surface. These dry adhesive materials which become tacky in the presence of moisture, are believed to be derived from degraded protein, and apparently comprise substances such as gelatin derived from muscle collagen, uncoagulated blood protein, and meucopolysaccharide, and meucoproteinate or similar materials and mixtures thereof. The variation in the inherent adhesive qualities of the freeze-dried fish food articles derived from different raw materials, such as tubifex worms and brine shrimp, for example, is adhesive being activated in the presence of moisture to enable said mass to be adhered to a surface.

4. A food article according to claim 1, wherein the adhesive attaching means is an added pressure-sensitive adhesive applied to at least one surface of said article.

5. A manufactured food article according to claim 1, capable of floating on water for a period of at least about 48 hours.

6. A dry, non-tacky, three-dimensional, manufactured fish food article according to claim 1, wherein the article is of a size suitable for a single feeding of fish in an aquarium, the unified mass comprising freeze-dried fresh brine shrimp is porous, and the article when moistened and pressed against a surface is adherent to said surface and capable of having morsels of food detached therefrom by feeding fish.

7. A manufactured food article for aquatic animals comprising, in combination, a unified mass of food and means for adhesively attaching said mass to a surface, said unified mass comprising freeze-dried animal matter selected from the group consisting of tubifex worms, brine shrimp and mixtures of tubifex worms and brine shrimp, said animal matter being detachable in fragments from said mass by aquatic animals feeding thereon.

8. A food article according to claim 7, wherein the animal matter is tubifex worms.

9. A dry, non-tacky, three-dimensional, manufactured fish food article according to claim 8, wherein the article is of a size suitable for a single feeding of fish in an aquarium, the unified mass comprising freeze-dried fresh tubifex worms is porous, and the article when moistened and pressed against a surface is adherent to said surface and capable of having morsels of food detached therefrom by feeding fish.

10. A manufactured food article according to claim 9, wherein the tubifex worms were frozen alive.

References Cited

UNITED STATES PATENTS 2,583,964   1/1952   Otter et al.

OTHER REFERENCES

Cotson et al.: Freeze-Drying of Foodstuffs, Columbine Press, Manchester and London, 1963, pp. 276 and 277.

A. LOUIS MONACELL, *Primary Examiner.*

ARNOLD RUEGG, *Examiner.*

S. E. HEYMAN, *Assistant Examiner.*